L. BURG.
VEHICLE AXLE SPINDLE.
APPLICATION FILED OCT. 1, 1908.
913,100.
Patented Feb. 23, 1909.
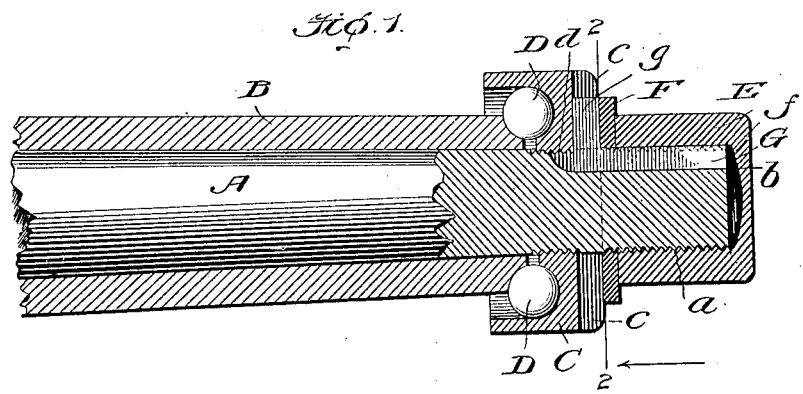
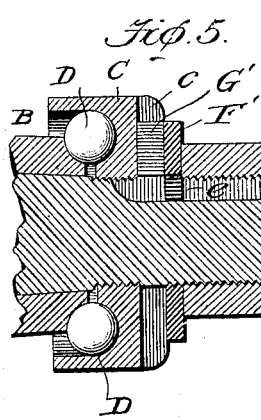
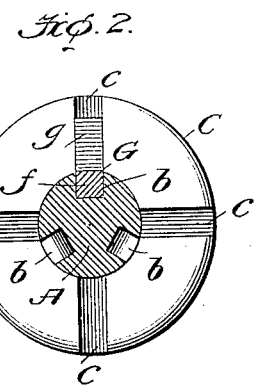
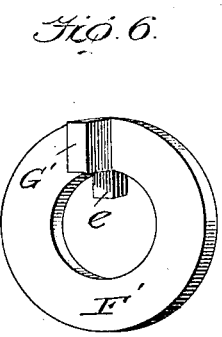
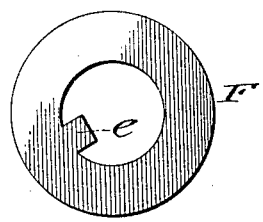
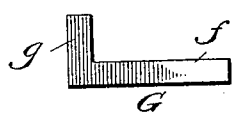
Witnesses
Inventor
Louis Burg
James Sheehy
Attorney

UNITED STATES PATENT OFFICE.

LOUIS BURG, OF DALLAS CITY, ILLINOIS.

VEHICLE-AXLE SPINDLE.

No. 913,100.　　　Specification of Letters Patent.　　　Patented Feb. 23, 1909.

Application filed October 1, 1908. Serial No. 455,629.

*To all whom it may concern:*

Be it known that I, LOUIS BURG, citizen of the United States, residing at Dallas City, in the county of Hancock and State of Illinois, have invented new and useful Improvements in Vehicle-Axle Spindles, of which the following is a specification.

My invention relates to improvements in vehicle axle spindles and the appurtenances thereof, and more particularly to means for locking ball bearing cups and nuts against casual rotation on the spindles by which they are carried; and it consists in the strong and durable and otherwise practical and desirable construction hereinafter described and particularly pointed out in the claim appended.

In the drawings accompanying and forming part of this specification: Figure 1 is a view, partly in elevation and partly in section, of a construction constituting a practical embodiment of my invention. Fig. 2 is a section taken in the plane indicated by the line 2—2 of Fig. 1 looking in the direction indicated by arrow and showing the face of the ball bearing cup and the relative arrangement of the axle spindle, the ball bearing cup, and the key for holding the latter against casual rotation on the spindle. Fig. 3 is an elevation of the washer designed to be held against rotation on the spindle by virtue of its being locked thereto and to be interposed between the ball bearing cup and the nut with a view of preventing vibration of the cup from loosening the nut. Fig. 4 is a view in side elevation of the form of key which I prefer to employ for locking the ball bearing cup to the spindle and preventing casual movement of the cup on the spindle. Fig. 5 is a view similar to Fig. 1 of a modification hereinafter referred to in detail. Fig. 6 is a view of the washer comprised in the modified construction.

Similar letters designate corresponding parts in all of the views of the drawings, referring to which:

A is an axle spindle which is threaded in the usual manner, as indicated by *a*, but is peculiar in that it is provided with a plurality of, preferably three, longitudinal grooves *b* which extend from its end inwardly about the proportional distance illustrated and are equidistant, as shown in Fig. 2.

B is a box mounted on the spindle A.

C is the ball bearing cup comprised in my improvements, and D D are anti-friction balls interposed between the outer end of the box B and the inner side of the cup C in the manner and for the purpose well known in the art. The cup C is peculiar in that it is provided in its face or outer side with a plurality of, preferably four, grooves *c* which extend from its threaded bore *d* to its perimeter as clearly shown in Fig. 2 and are each designed to be registered with one of the grooves *b* in the spindle.

E is a nut, preferably of cap-type and hexagonal form in cross-section, mounted on the threaded end of the spindle, and F is a washer of metal, having an inwardly extending projection *e* of a shape and size to enter one of the grooves *b* in the spindle. The said washer F is keyed to the spindle because of the arrangement of its projection *e* in one of the spindle grooves *b*, and by virtue of its interposition between the cup C and the nut E it is adapted to preclude the transmission of vibration from the cup to the nut during the use of the improvements and is consequently adapted to lessen the liability of the nut casually working loose, and this without interfering in any measure with the nut being turned on and off the spindle when desired.

G is a key which has for its office to lock the ball bearing cup C to the spindle and in that way prevent the cup shifting its position on the spindle. The said key is preferably of the L-shaped form illustrated, but I would have it understood that it may be of any other form consonant with the purpose of my invention so long as it has a portion *f* adapted to rest in one of the grooves *b* of the spindle, and a portion *g* adapted to rest in that groove *c* of the ball cup that is registered with the mentioned groove of the spindle. When the key G is arranged as stated, it obviously will be held against outward movement by the washer F and the nut E backing the washer, and will be enabled to preclude turning of the ball cup on the spindle. When, however, the nut E is turned and the washer F is moved outwardly on the spindle, the portion *g* of the key G may be withdrawn from the groove in the face of the ball cup, and the said ball cup may then be turned on the spindle to take up wear or for any other purpose, after which the arrangement of the portion *g* of the key in one of the grooves of the ball cup and the movement of the washer F and nut E back into the positions shown in Fig. 1 will result in the ball cup being as securely locked to the spindle as before. It will further be noted that when it is necessary for any reason to remove the box B from the spindle, the several parts of my improvements may first be expeditiously and easily removed.

It will be gathered from the foregoing that my improvements do not involve the provision of grooves in the threaded part or bore of the ball cup, the ball cup being merely grooved in its face or outer side. This will be appreciated as an important advantage when it is remembered that ordinarily the ball cup will be case-hardened, while the spindle will not, and were grooves provided in the threaded part of the ball cup it would diminish the period of usefulness of the improvements because such grooves would have cutting edges, and said cutting edges would tend to reduce the threaded part of the spindles. Moreover said grooves would have a tendency to interlock with the grooves in the spindle, and in that way bring about serious deterioration of the thread on the spindle.

Notwithstanding the practical advantages hereinbefore ascribed to my improvements, it will be noted that the same are simple and inexpensive in construction and are also neat in appearance and therefore calculated to enhance rather than detract from the finished appearance of a vehicle.

In the modified construction shown in Figs. 5 and 6, the key G is omitted, and a washer F' is employed, which in addition to the inwardly-extending projection e for locking it to the axle spindle A, is provided on its inner side with a key G', designed to rest in one of the grooves c of the ball cup C and thereby lock said cup to the spindle. It will also be observed that in said modified construction, the washer F' is interposed between the ball cup C and the nut E, and hence prevents the vibration of the cup when in use from tending to casually loosen the nut.

It will be gathered from the foregoing that the device F$^v$ is a combined key and washer, and is equally as efficient as the separate washer F and key G of Figs. 1 to 4.

While I have entered into a detailed description of the construction and relative arrangement of the parts comprised in the present and preferred embodiments of my invention, I do not desire to be understood as confining myself to the same inasmuch as changes in form, particularly of the grooves c and the portion g of key G may be made without involving departure from the scope of my invention as defined in the claim appended.

Having described my invention, what I claim and desire to secure by Letters-Patent, is:

The combination of an axle spindle having a threaded outer portion and also having a plurality of equidistant, longitudinal grooves in said portion, a box surrounding the spindle, a ball-bearing cup having a threaded bore receiving the threaded portion of the spindle and also having a plurality of equi-distant grooves in its face, extending outwardly from its bore and each adapted to register with a groove of the spindle, anti-friction balls interposed between the end of the box and the cup, a washer interposed between the face of the cup and the inner end of a nut on the spindle and having a portion disposed in one of the spindle grooves, the said nut, and a key having a portion disposed in one groove of the spindle and another portion disposed in a registered groove of the cup and arranged at the inner side of the washer.

In testimony whereof I have hereunto set my hand in presence of two subscribing witnesses.

LOUIS BURG.

Witnesses:
C. H. KISTNER,
ANDREW KIRBY.